United States Patent
Aso et al.

(10) Patent No.: US 6,898,178 B2
(45) Date of Patent: May 24, 2005

(54) ATM DEVICE, SUBSCRIBER SYSTEM, COMMUNICATION SYSTEM AND BACKUP METHOD

(75) Inventors: Ikuo Aso, Koriyama (JP); Isao Wada, Koriyama (JP); Sakae Watanabe, Koriyama (JP)

(73) Assignee: Hitachi Telecom Technologies, Ltd., Koriyama (JP)

( * ) Notice: Subject to any disclaimer, the term of this patent is extended or adjusted under 35 U.S.C. 154(b) by 884 days.

(21) Appl. No.: 09/821,021

(22) Filed: Mar. 30, 2001

(65) Prior Publication Data

US 2002/0141335 A1 Oct. 3, 2002

(51) Int. Cl.[7] .............................................. H04L 12/26
(52) U.S. Cl. .................................. 370/228; 370/395.21
(58) Field of Search ........................... 370/228, 395.21, 370/395.1, 395.5, 216, 217, 218, 219, 221, 224, 389, 392, 535

(56) References Cited

U.S. PATENT DOCUMENTS 6,167,025 A * 12/2000 Hsing et al. ................. 370/216
6,618,400 B1 * 9/2003 Okamura .................... 370/524

* cited by examiner

Primary Examiner—Chi Pham
Assistant Examiner—Alexander O. Boakye
(74) Attorney, Agent, or Firm—Antonelli, Terry, Stout & Kraus, LLP (57) ABSTRACT

A technology is disclosed to enable VP/VC on an ATM network to be backed up by using an ISDN line without presetting any detailed information regarding a backup VP/VC to be set on the ISDN line. An ATM switch A30 is provided to establish the ISDN line connecting with an ATM multiplexer A20 when any failure occurs in an ATM transmission path contacting with the ATM multiplexer A20. Negotiation is carried out with ATM multiplexer A30 by using the established ISDN line so as to decide a channel characteristic of a backup VP/VC to be set on the ISDN line. Then, the ATM switch A30 and the ATM multiplexer A20 communicate with each other by using the backup VP/VC having the decided channel characteristic on the ISDN line.

10 Claims, 8 Drawing Sheets

ATM CELL CONSTITUTION

ATM DEVICE, SUBSCRIBER SYSTEM, COMMUNICATION SYSTEM AND BACKUP METHOD

BACKGROUND OF THE INVENTION

The present invention relates to a technology for backing up the virtual communication channel of an asynchronous transfer mode (ATM) network by using a non-ATM line.

There has been an ATM device for communications by the use of the virtual communication channel on the ATM network, which is provided by the virtual path/virtual channel (VP/VC) fixedly set by the permanent virtual channel (PVC).

As a backup technology to deal with the failure of the virtual communication channel on the ATM device, there is known a technology that a virtual channel is set on the integrated service digital network (ISDN) line by considering the ISDN line as a transmission path for an ATM cell. This technology is specifically designed to transmit a ATM cell, which should have been transmitted using the failed virtual communication channel on the ATM network, by using the virtual channel set on the ISDN line.

According to such a backup technology, backup constitution information is set beforehand in two devices for carrying out communications by using the virtual communication channel on the ATM network. The backup constitution information contains bits of information regarding a virtual path identifier/virtual channel identifier (VPI/VCI) used to identify the VP/VC of the virtual communication channel on the ISDN line used for backing up, a band, a service class, and so on. For actual backing-up, the two devices set the virtual communication channel on the ISDN line according to the backup constitution information set therein, and then carry out communications.

SUMMARY OF THE INVENTION

However, problems described below will arise if the foregoing technology is applied to an ATM multiplexer (e.g., ATM CLAD), which performs relaying between a plurality of communication channels set on the non-ATM network such as an ISDN or the like and a plurality of virtual communication channels fixedly set on the ATM network.

Specifically, for each of the plurality of virtual communication channels fixedly set on the ATM network and used by the ATM multiplexer, there is a need to set backup connection information in the ATM multiplexer so as to match with the backup constitution information set in the opposite communication device. Consequently, a heavy burden is placed on the manager of the ATM multiplexer. Needless to say, such a burden becomes heavier as the number of virtual communication channels fixedly set on the ATM network and used by the ATM multiplexer is increased.

If at least one of the two devices engaged in communications by using the virtual communication channel to be backed up is not operable in accordance with the backup constitution information, then the backup cannot be executed.

The present invention was made with the foregoing problems in mind, and it is an object of the invention to make it possible to back up a virtual communication channel on the ATM network by using the non-ATM network even without presetting any detailed information regarding a virtual communication channel to be set on the non-ATM network.

In order to achieve the object, the present invention provides an ATM device designed to perform communications with an opposite device by using a virtual communication channel on an ATM network provided by a VP/VC fixedly set based on a PVC.

The ATM device of the present invention comprises: setting means for setting a communication path on a non-ATM network so as to contact with the opposite device, the communication path being used for backing up the virtual communication channel fixedly set on the ATM network; deciding means for considering the communication path as a transmission path for an ATM cell when failure occurs in the virtual communication channel set on the ATM network and then deciding a channel characteristic of a backup virtual communication channel set on the communication path by negotiating with the opposite device through the communication path; and switching means for switching a communication channel to be used for communications with the opposite device from the failed virtual communication channel to the backup virtual communication channel on the communication path having the channel characteristic decided by the deciding means when the failure occurs in the virtual communication channel set on the ATM network.

In the ATM device of the present invention, the characteristic of the backup virtual communication channel of the virtual communication channel fixedly set on the ATM network is decided at the time of backup execution by negotiating with the opposite communication device, with which communications are carried out by using the virtual communication channel fixedly set on the ATM network. Thus, it is possible to realize backing-up by using the communication path of the non-ATM network even without presetting various bits of information regarding the characteristic of the backup virtual communication channel as backup constitution information in the ATM device so as to match with backup constitution information set in the opposite device.

DETAILED DESCRIPTION OF THE PREFERRED EMBODIMENTS

Next, description will be made for the preferred embodiment of the present invention.

Figure 1:
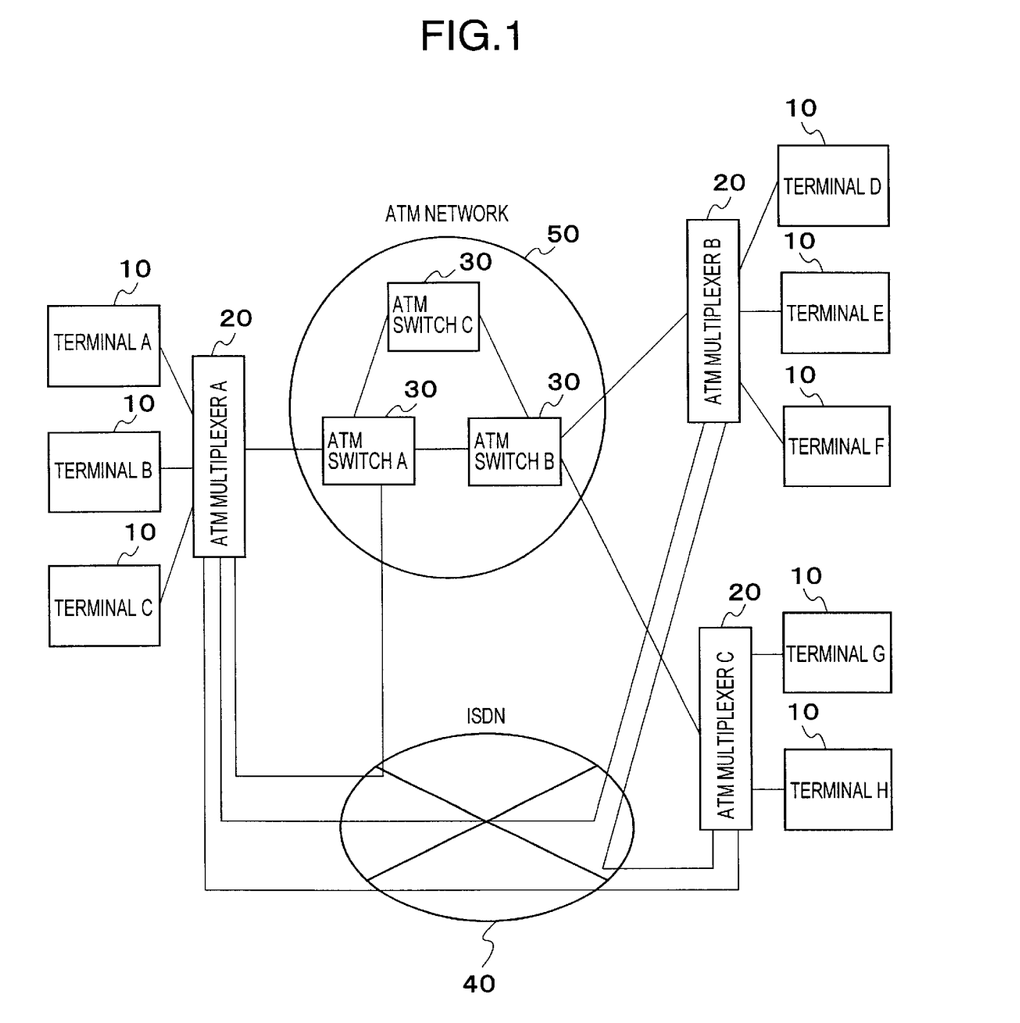
FIG. 1 is a schematic constitutional diagram of a communication system according to an embodiment of the present invention.

FIG. 1 is a schematic constitutional diagram of a communication system to which an embodiment of the present invention is applied.

As shown in FIG. 1, the communication system of the invention is constructed by connecting an ATM multiplexer 20 connecting at least one terminal 10 to an ATM network 50 including a plurality of ATM switches 30. Each ATM multiplexer 20 is connected to an ISDN 40. Also, an ATM switch A30 is connected to the ISDN 40.

Here, an interface between the ATM network 50 and the ATM multiplexer 20 is a user network interface provided according to the ATM network 50. On the other hand, for an interface between the terminal 10 and the ATM multiplexer 20, optional one of the interfaces such as a user network interface based on the ATM network, the user network interface of the ISDN, a transmission control protocol/Internet protocol (TCP/IP) interface, and the like may be employed.

Figure 2:
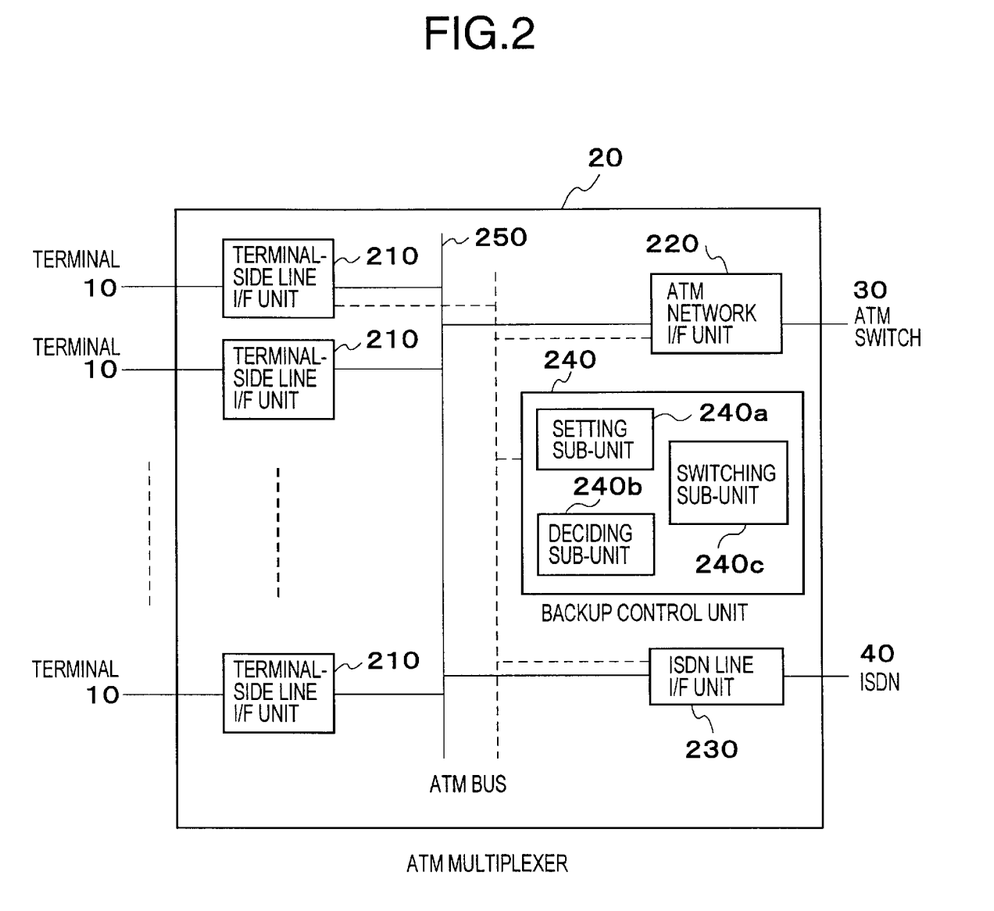
FIG. 2 is a schematic constitutional diagram of an ATM multiplexer shown in FIG. 1.

FIG. 2 is a schematic constitutional diagram of the ATM multiplexer 20.

As shown in FIG. 2, the ATM multiplexer 20 includes a terminal-side line interface unit 210, an ATM network interface unit 220, an ISDN line interface unit 230, a backup control unit 240, and an ATM bus 250. Further, the backup control unit 240 includes a setting sub-unit 240a, a deciding sub-unit 240b, and a switching sub-unit 240c.

The ATM multiplexer 20 thus constituted is normally operated roughly in a manner described below.

Specifically, the terminal-side line interface unit 210 receives data from the terminal 10 connected thereto, and then stores the received data into the payload of an ATM cell, in which the VCI/VPI of a VP/VC fixedly set based on a PVC have been stored in the ATM cell header thereof to be used for communications carried out by the terminal 10. This ATM cell is transmitted through the ATM bus 250 and the ATM network interface unit 220 to the ATM switch 30 connected to the ATM network interface unit 220.

On the other hand, upon receiving the ATM cell from the ATM switch 30 connected thereto, the ATM network interface unit 220 checks whether or not the VCI/VPI stored in the ATM cell header is identical to the VCI/VPI of the VP/VC fixedly set based on the PVC for communications which are carried out by the terminal 10 connected to the ATM multiplexer 20. If identical, then the ATM cell is transmitted through the ATM bus 250 to the terminal-side line interface unit 210 connected to the terminal 10, which uses the VP/VC having the VCI/VPI stored in the ATM cell header for its communications. The terminal-side line interface unit 210 extracts data from the payload of the ATM cell received through the ATM bus 250, and then transmits this data to the terminal 10 connected thereto.

During the backup, the ATM multiplexer 20 thus constituted is operated roughly in a manner described below.

Specifically, the backup control unit 240 sets a backup VP/VC to be identified by a particular VCI/VPI on an ISDN line connected to the ISDN line interface unit 230.

In addition, the backup control unit 240 controls the respective units so as to execute the following operations:

(1) The terminal-side line interface unit 210 connected to the terminal 10 using the backup VP/VC for its communications stores the data received from the terminal 10 into the payload of the ATM cell, in which the VCI/VPI of the backup VP/VC have been stored in the ATM cell header thereof. Then, this ATM cell is transmitted through the ATM bas 250 to the ISDN line interface unit 230. Subsequently, the ISDN line interface unit 230 transmits this ATM cell to the ISDN line housed therein.

(2) The ISDN line interface unit 230 checks whether or not the VCI/VPI stored in the ATM cell header of the ATM cell received from the ISDN line housed therein is identical to the VCI/VPI of the backup VP/VC. If identical, then the ATM cell is transmitted through the ATM bus 250 to the terminal-side line interface unit 210 connected to the terminal 10, which carries out communications by using VP/VC backed-up by the backup VP/VC. Subsequently, the terminal-side line interface unit 210 extracts data from the payload of the ATM cell received through the ATM bus 250, and then transmits this data to terminal 10 connected thereto.

Figure 3:
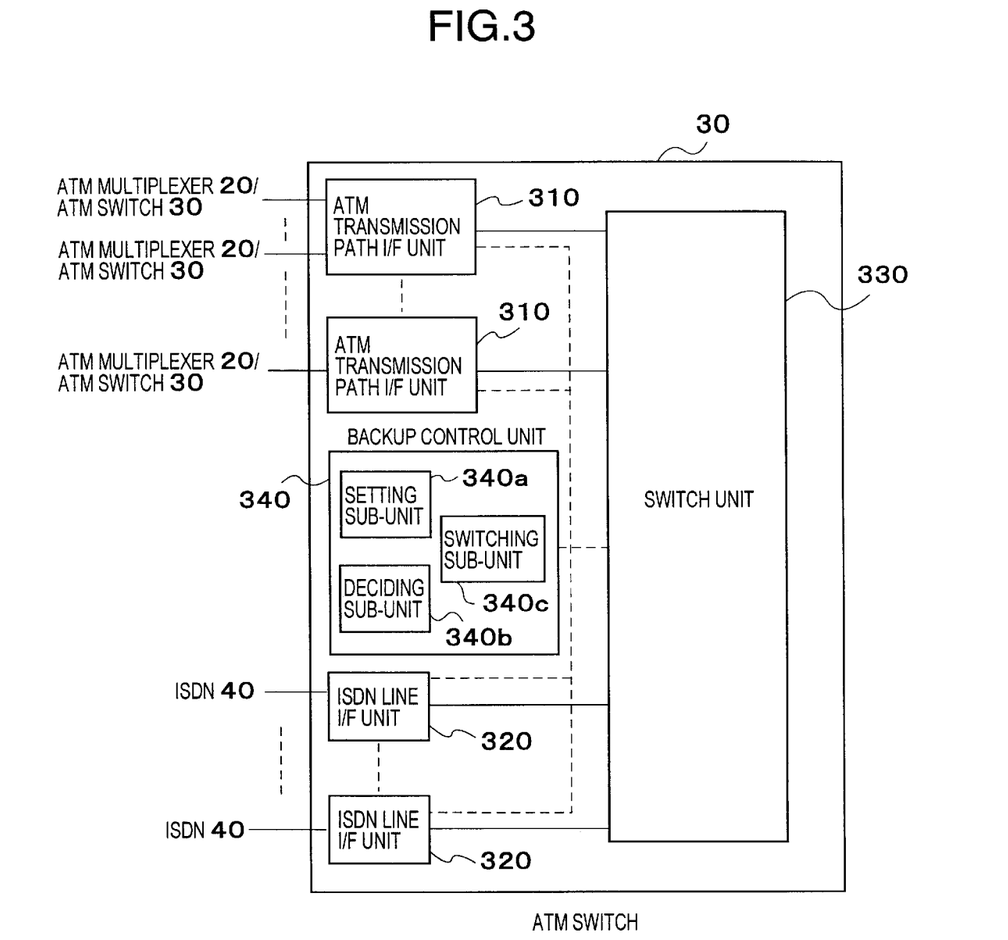
FIG. 3 is a schematic constitutional diagram of an ATM switch shown in FIG. 1.

FIG. 3 is a schematic constitutional diagram of the ATM switch 30.

As shown in FIG. 3, the ATM switch 30 includes an ATM transmission path interface unit 310, an ISDN line interface unit 320, a switch unit 330, and a backup control unit 340. Further, the backup control unit 340 includes a setting sub-unit 340a, a deciding sub-unit 340b, and a switching sub-unit 340c.

The ATM switch 30 thus constituted is normally operated roughly in a manner described below.

Specifically, the ATM transmission path interface unit 310 receives an ATM cell from the ATM multiplexer 20 or other ATM switches 30 through an ATM transmission path connected thereto, and then passes this ATM cell to the switch unit 330. The switch unit 330 passes the ATM cell to the ATM transmission path interface unit 310 set according to a VP/VC, which is indicated by a VCI/VPI stored in the ATM cell header thereof. Upon receiving the ATM cell from the switch unit 330, the ATM transmission path interface unit 310 transmits this ATM cell to an ATM transmission path connected thereto.

During the back up, the ATM switch 30 thus constituted is operated roughly in a manner described below.

Specifically, the backup control unit 340 sets a backup VP/VC to be identified by a particular VCI/VPI on an ISDN line connected to the ISDN line interface unit 320.

In addition, the backup control unit 340 controls the respective units so as to execute the following operations:

(1) The ATM transmission path interface unit 310 checks whether or not the VCI/VPI stored in the ATM cell header of the ATM cell received through the ATM transmission path connected thereto is identical to the VCI/VPI of a VP/VC to be backed up. If identical, then the VCI/VPI stored in the ATM cell header is changed to the VPI/VCI of the backup VP/VC and sent to the switch unit 330. Then, the switch unit 330 transmits the ATM cell to the ISDN line interface unit 320 set according to the backup VP/VC, which is indicated by the VCI/VPI stored in the ATM cell header thereof. Subsequently, the ISDN line interface unit 320 transmits this ATM cell to the ISDN line housed therein.

(2) The ISDN line interface unit 320 checks whether or not the VCI/VPI stored in the ATM cell header of the ATM cell received through the ISDN line connected thereto is identical to the VCI/VPI of the backup VP/VC. If identical, then the VCI/VPI stored in the ATM cell header is changed to the VPI/VCI of a VP/VC to be backed up by the backup VP/VC, and sent to the switch unit 330. The switch unit 330 transmits the ATM cell to the ATM transmission path housing interface unit 310 set according to the VP/VC, which is indicated by the VCI/VPI stored in the ATM cell header. Subsequently, the ATM transmission path interface unit 310 transmits this ATM cell to the ATM transmission path connected thereto.

In the above operations (1) and (2), the VPI/VCI of the VP/VC to be backed up may vary between before and after the switching of the ATM cell in the switch unit 330. This is because the ATM network permits one VP/VC to be represented by a different VPI/VCI for each portion (in this case, for each of the positions divided by the ATM switches).

Next, detailed description will be made for the setting operations of the backup VP/VC carried out by the backup control units 240 and 340 of the ATM multiplexer 20 and the ATM switch 30 respectively in the communication system constituted in the foregoing manner.

First, the setting operation of a backup VP/VC mainly executed by the backup control unit 340 of the ATM switch 30 is described in detail.

It is assumed that in the communication system shown in FIG. 1, failure such as disconnection or the like occurs in the transmission path between the ATM multiplexer A20 and the ATM switch 30.

In this case, in the ATM switch A30, the ATM transmission path interface unit 310 connecting the above transmission path detects the occurrence of the failure in the transmission path, and notifies this detected failure to the backup control unit 340. After the backup control unit 340 has received such information, the setting sub-unit 340a thereof controls the ISDN line interface unit 320, and establishes an ISDN line with the ATM multiplexer A20 in cooperation with the same. Then, the deciding sub-unit 340b of the backup control unit 340 creates backup connection information regarding the VPI/VCI of each VP/VC set on the transmission path, the VPI/VCI of the backup VP/VC of each VP/VC set on the established ISDN line, a band, a service class, and so on, and then transmits this information to the ISDN line interface unit 320. Subsequently, the ISDN line interface unit 320 generates its own connection control ATM cell to store the received backup connection information, and notifies this ATM cell through the established ISDN line to the ATM multiplexer A20.

On the other hand, in the ATM multiplexer A20, the setting sub-unit 240a of the backup control unit 240 receives a line establishing command from the ATM switch A30 through the ISDN line interface unit 230. Then, the setting sub-unit 240a controls the ISDN line interface unit 230 to establish an ISDN line connecting with the ATM switch A30 in cooperation with the same. The ISDN line interface unit 230 receives a connection control ATM cell through the ISDN line established with the ATM switch A30, and then takes out backup connection information from the connection control ATM cell. The backup connection information is then passed to the backup control unit 240. The deciding sub-unit 240b of the backup control unit 240 verifies whether the setting of the VPI/VCI of the backup VP/VC, the band, the service class or the like, which is indicated by the backup connection information, is acceptable or not, creates backup connection response information containing the permission/non-permission of connection, which is a result of the verification, and then passes the information to the ISDN line interface unit 230. Then, the ISDN line interface unit 230 generates its own connection control ATM cell storing the backup connection response information, and notifies this ATM cell through the established ISDN line to the ATM switch A30. Subsequently, if the result of the verification indicates the permission of connection, the switching sub-unit 240c of the backup control unit 240 sets a backup VP/VC to be identified by a VCI/VPI, which is indicated by the backup connection information, on the ISDN line housed in the ISDN line interface unit 230. Then, to enable the ATM multiplexer 20 to execute the operation during the backup roughly described above, each unit is controlled to start backing-up.

Now, in the ATM switch A30, after the reception of the connection control ATM cell through the ISDN line established with the ATM multiplexer A20, the ISDN line interface unit 320 takes out the backup connection response information from the connection control ATM cell. This backup connection control information is then passed to the backup control unit 340. Upon receiving the backup connection response information, the deciding sub-unit 340b of the backup control unit 340 verifies whether the backup connection response information indicates the permission of connection or not. If permitted, the switching sub-unit 340c of the backup control unit 340 sets a backup VP/VC to be identified by the VCI/VPI indicated by the backup connection information, to which the permission of connection thereof has been notified by the backup connection response signal, on the ISDN line connected to the ISDN line interface unit 320. Then, to enable the ATM switch 30 to execute the operation during the backup roughly described above, each unit is controlled to start backing-up.

Accordingly, backing-up is realized, which uses the ISDN line established between the ATM multiplexer A20 and the ATM switch A30, instead of the ATM transmission path between the ATM multiplexer A20 and the ATM switch A30.

Next, the setting operation of a backup VP/VC mainly executed by the backup control unit 240 of the ATM multiplexer 20 is described in detail.

If the foregoing backing-up mainly executed by the backup control unit 240 of the ATM switch 30 cannot be realized, for example, if the non-permission of connection is notified by the backup connection response information to the ATM switch 30, then the backup control unit 240 of the ATM multiplexer 20 performs the operation of setting a backup virtual communication channel described below.

It is assumed that in the communication system shown in FIG. 1, failure such as disconnection or the like occurs in the transmission path between the ATM multiplexer A20 and the ATM switch A30, and backing-up mainly executed by the ATM switch 30, using the ISDN line established between the ATM multiplexer A20 and the ATM switch A30, cannot be realized.

It is also assumed that at a normal time, the terminals A10 and B10 connected to the ATM multiplexer A20 respectively communicate with the terminals D10 and E10 connected to the ATM multiplexer B20 by using a VP/VC set based on a PVC; the terminal C10 connected to the ATM multiplexer A20 communicates with the terminal G10 connected to the ATM multiplexer C20 by using the VP/VC set based on the PVC; and the terminal F10 connected to the ATM multiplexer B20 communicates with the terminal H10 connected to the ATM multiplexer C20 by using the VP/VC set based on the PVC.

Figure 4:
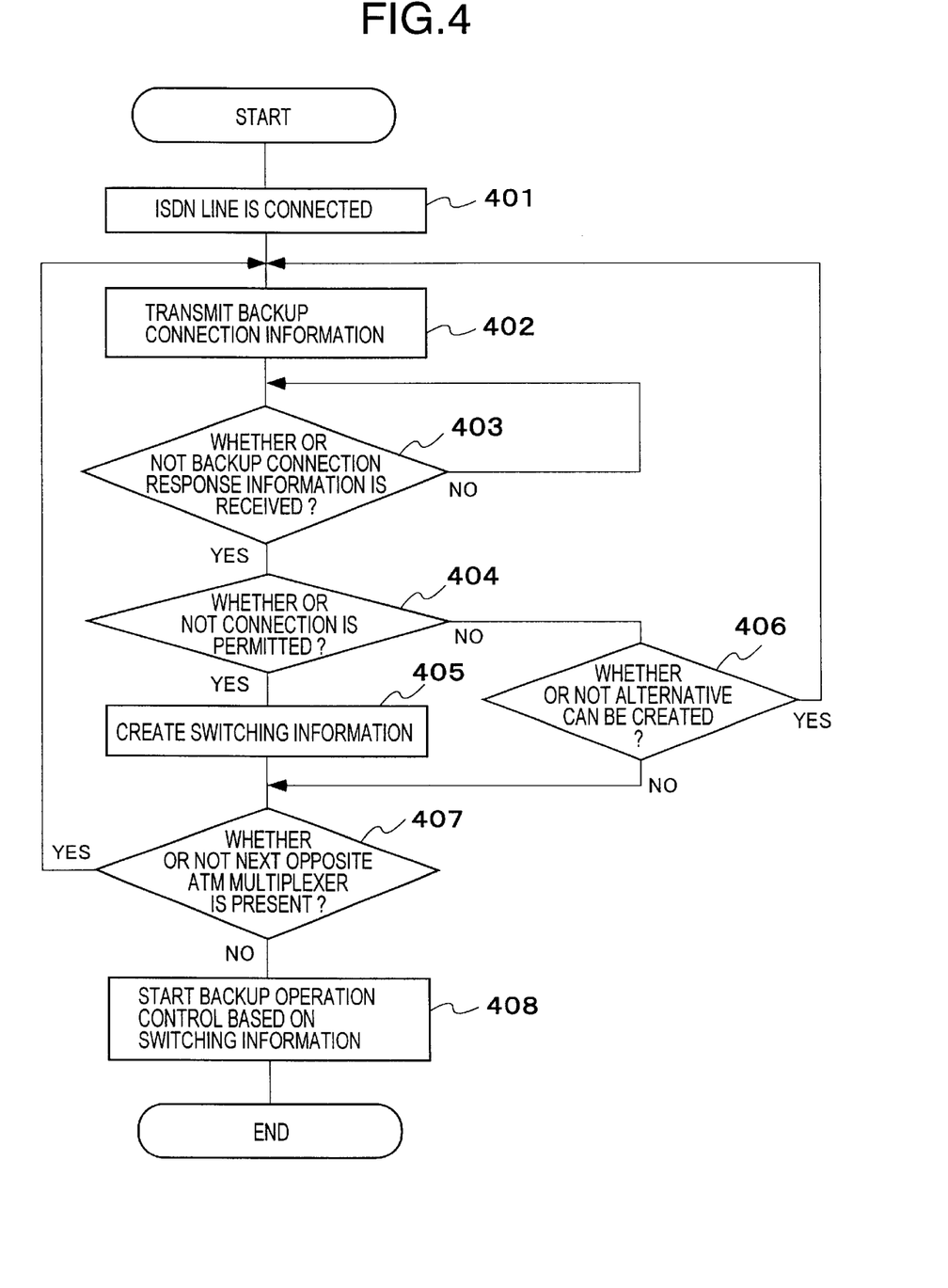
FIG. 4 is a flowchart showing a process carried out by an ATM multiplexer for starting the backup in the communication system shown in FIG. 1.

In this case, the backup control unit 240 of the ATM multiplexer A20 carries out a process shown in FIG. 4.

In the ATM multiplexer A20, the setting sub-unit 240a of the backup control unit 240 controls the ISDN line interface unit 230 to establish an ISDN line connecting with the ATM multiplexer B20 in cooperation with the same, which connects the terminals D10 and E10 to be communicated with the terminals A10 and B10 housed in the ATM multiplexer A20. Likewise, the setting sub-unit 240a controls the ISDN line interface unit 230 to establish an ISDN line connecting with the ATM multiplexer C20 in cooperation with the same, which connects the terminal G10 to be communicated with the terminal C10 connected to the ATM multiplexer A20 (step 401). Hereinafter, the ATM multiplexers B20 and C20 to become partners of communications using the ISDN lines are referred to as opposite ATM multiplexers.

Subsequently, in the ATM multiplexer A20, the deciding sub-unit 240b of the backup control unit 240 executes each processing of the following steps 402 to 406 for the opposite ATM multiplexers (step 407).

Specifically, backup connection information is created, which contains: bits of information regarding the terminal connected to the ATM multiplexer A20 and engaged in communications with the terminal connected to the opposite ATM multiplexer (the terminals A10 and B10 when the opposite ATM multiplexer is one denoted at B20, or the terminal C10 when the opposite ATM multiplexer is one denoted at C20); the VPI/VCI of a backup VP/VC on the ISDN line relative to the VP/VC on the ATM network used by the terminal for communications; a band; a service class; and so on. This backup connection information is transmitted to the ISDN line interface unit 230. The ISDN line interface unit 320 is caused to generate its own connection control ATM cell storing the backup connection information, and then this ATM cell is notified through the established ISDN line to the opposite ATM multiplexer (step 402).

Then, in the ATM multiplexer A20, after receiving the connection control ATM cell through the ISDN line established with the opposite ATM multiplexer, the ISDN line interface unit 230 takes out backup connection response information from the connection control ATM cell. Then, the backup connection response information is passed to the backup control unit 340 (step 403). Upon receiving the backup connection response information, the deciding sub-unit 340b of the backup control unit 340 verifies whether this backup connection response information indicates the permission of connection or not (step 404).

If it is determined in step 404 that the backup connection response information indicates the non-permission of connection, then determination is made as to the possibility of creating an alternative, that is, a VPI/VCI of the backup VP/VC set on the ISDN line established with the opposite ATM multiplexer, a band, a service class, and so on. (i.e., possibility of making reservations with the ISDN) (step 407). If possible, then the process returns to step 402. Here, a connection control ATM cell is generated, which stores backup connection information based on the alternative, and this ATM cell is transmitted to the opposite ATM multiplexer again. If not possible, then the process returns to step 402 if a next opposite ATM multiplexer is present (step 407). Here, each processing of the steps 402 to 406 is executed for the next ATM multiplexer.

On the other hand, in the case where it is determined in step 404 that the backup connection response information indicates the permission of connection, then the switching sub-unit 340c of the backup control unit 340 creates switching information for setting a backup VP/VC to be identified by a VCI/VPI on the ISDN line established with the opposite ATM multiplexer, the VCI/VPI being indicated by the backup connection information whose connection possibility has been notified based on the backup connection response information (step 405).

Now, in the ATM multiplexer A20, after the end of each processing of the steps 402 to 406 for all the opposite ATM multiplexers, the switching sub-unit 340c of the backup control unit 340 sets a backup VP/VC on the ISDN line established with each opposite ATM multiplexer according to the switching information created thus far. Then, to enable the ATM multiplexer 20 to execute the operation during the backup roughly described above, each unit is controlled to start backing-up (step 408).

Figure 5:
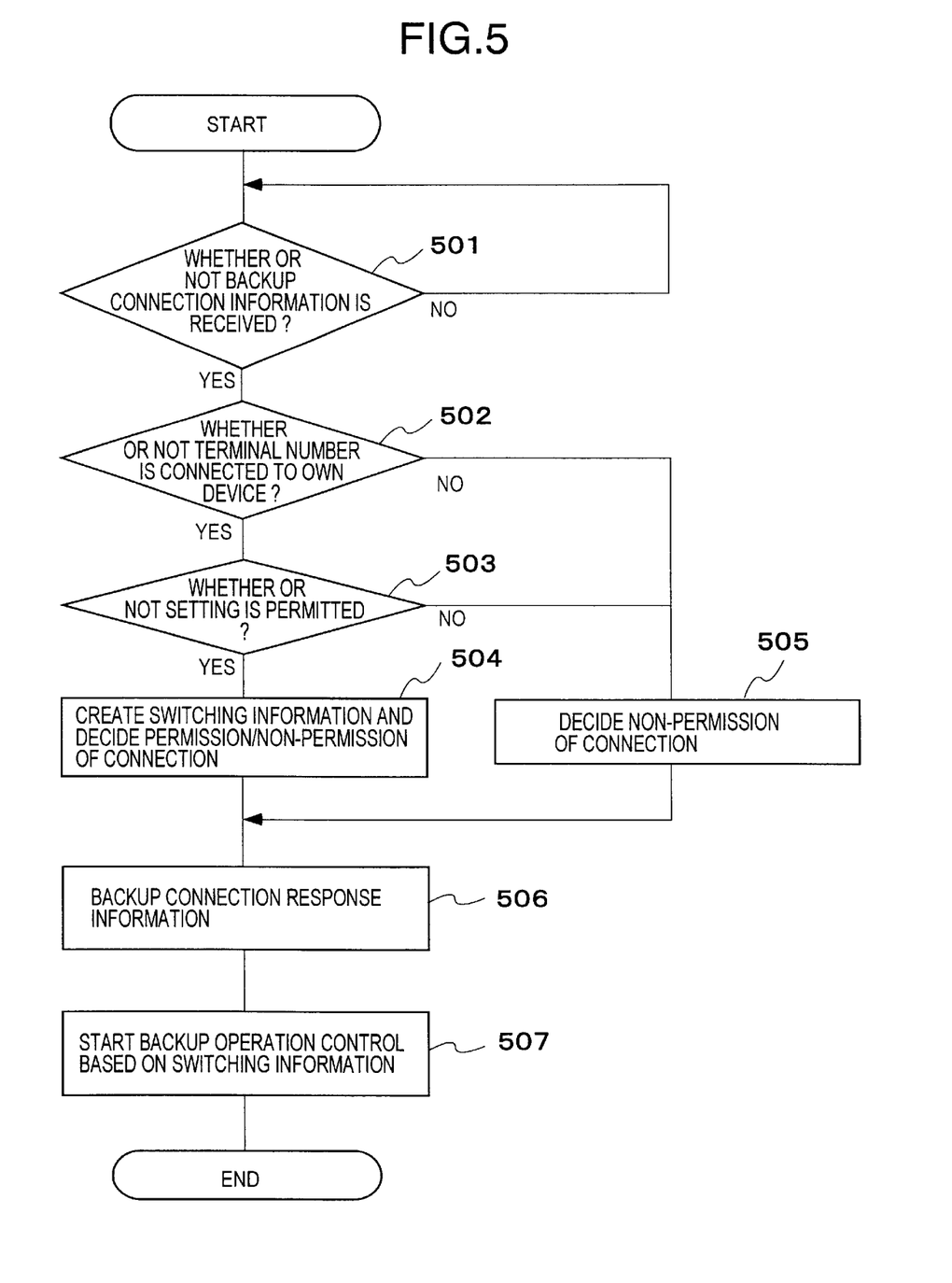
FIG. 5 is a flowchart showing a process carried out by an ATM multiplexer being notified of the start of the backup in the communication system shown in FIG. 1.

On the other hand, each of the ATM multiplexers B10 and C10, which are the opposite ATM multiplexers that have received the backup connection information from the ATM multiplexer A20 carries out processing shown in FIG. 5.

Specifically, in the opposite ATM multiplexer, the setting sub-unit 240a of the backup control unit 240 receives a line establishing command from the ATM multiplexer A20 through the ISDN line interface unit 230. Then, the setting sub-unit 240a controls the ISDN line interface unit 230 to establish an ISDN line connecting with the ATM multiplexer A20 in cooperation with the same. Then, the ISDN line interface unit 230 receives a connection control ATM cell through the ISDN line established with the ATM multiplexer A20, and then takes out the backup connection information from the connection control ATM cell. This backup connection information is then passed to the backup control unit 240. Upon receiving the backup connection information (step 501), the backup control unit 240 executes processing described below.

First, the deciding sub-unit 240b of the backup control unit 240 verifies whether a terminal indicated by the backup connection information is the one engaged in communications with the terminal connected to its own device or not (step 502). If so, then for the terminal connected to its own device, which is the communication partner of the terminal indicated by the backup connection information, the permission of connection is decided if the setting of the VPI/VCI of a backup VP/VC, a band, a service class, and so on, which are indicated by the backup connection information, is allowed (step 503). Then, switching information is created for setting a backup VP/VC to be identified by the VCI/VPI, which is indicated by the backup connection information on the ISDN line established with the ATM multiplexer A20 (step 504). On the other hand, if otherwise (in the case of No in either step 502 or step 503), then the non-permission of connection is decided (step 505).

Then, the deciding sub-unit 240b of the backup control unit 240 creates backup connection response information containing one regarding the decided permission/non-permission of connection, and passes this information to the ISDN line interface unit 230. The ISDN line interface unit 230 is then caused to create its own connection control ATM cell storing the backup connection response information. This ATM cell is then notified to the ATM multiplexer A20 through the established ISDN line (step 506). Subsequently, in accordance with the created switching information, the switching sub-unit 240c of the backup control unit 240 sets a backup VP/VC on the ISDN line established with the ATM multiplexer A20. Then, to enable the ATM multiplexer 20 to execute the operation during the backup roughly described above, each unit is controlled to start backing-up (step 507)

The foregoing processing enables communications to be carried out respectively between the terminals shown in FIG. 1: the terminal A10 connected to the ATM multiplexer A20 can communicate with the terminal D10 connected to the ATM multiplexer B20 by using the backup VP/VC set on the ISDN line established between the ATM multiplexers A20 and B20; the terminal B10 connected to the ATM multiplexer A20 can communicate with the terminal E10 connected to the ATM multiplexer B20 by using the backup VP/VC on the ISDN line established between the ATM multiplexers A20 and B20; and the terminal C10 connected to the ATM multiplexer A20 can communicate with the terminal G10 connected to the ATM multiplexer C20 by using the backup VP/VC on the ISDN line established between the ATM multiplexers A20 and C20. In other words, it is possible to realize backing-up, which uses the ISDN line instead of the VP/VC on the ATM network.

In practice, the setting of the backup VP/VC and the deciding of the permission/non-permission of its setting described above with reference to the processes shown in FIGS. 4 and 5 are carried out not for each set of the backup connection information and the backup connection response information created as a result of response to the same, but for each terminal included in the backup connection information, i.e., for each VP/VC to be backed up.

Now, consideration is given to the occurrence of failure, such as disconnection or the like, in the ATM transmission path between the ATM multiplexer B20 and the ATM switch B30. Here, it is assumed that such failure occurs while the backing-up has been executed based on the above-described processes shown in FIGS. 4 and 5, and also, in FIG. 1, communications can be carried out respectively between the terminals: between the terminal A10 connected to the ATM multiplexer A20 and the terminal D10 connected to the ATM multiplexer B20 by using the backup VP/VC; between the terminal B10 connected to the ATM multiplexer A20 and the terminal E10 connected to the ATM multiplexer B20 by using the backup VP/VC; and between the terminal C10 connected to the ATM multiplexer A20 and the terminal G10 connected to the ATM multiplexer C20 by using the backup VP/VC.

In this case, as described above, a backup VP/VC setting operation is carried out mainly by the backup control unit 340 of the ATM switch B30, and thereby an ISDN line is established between the ATM switch B30 and the ATM multiplexer B20. Then, backup connection information is transmitted from the ATM switch B30 to the ATM multiplexer B20, the information regarding the VP/VC on the ATM network, which has been used by each of the terminals D10, E10 and F10, which are connected to the ATM multiplexer B20.

At this point, however, backing-up by the ISDN line has already been executed for the terminals D10 and E10. In such a case, the backup control unit 240 of the ATM multiplexer B20 always decides the non-permission of connection for the VP/VC used for communications by the already backed-up terminals D10 and E10 irrespective of the VPI/VCI of the backup VP/VC, a band, a service class, and so on, which are indicated by the backup connection information. Only for the VP/VC used for communications by the terminal F10 not backed up yet, the backup control unit 240 checks whether the setting of the VPI/VCI of the backup VP/VC, a band, a service class, and so on, which are indicated by the backup connection information is acceptable or not, and then decides the permission/non-permission of connection according to the result of the checking. Then, backup connection response information containing the information of connection permission/non-permission is created, stored in a connection control ATM cell, and returned to the ATM switch B30. Accordingly, between the ATM switch B30 and the ATM multiplexer B20, the above-described backing-up operation is carried out only for the VP/VC used for communications by the terminal F10.

Next, description will be made for the example of a data format used for the above-described transmission of each of the backup connection information and the backup connection response information.

Figure 6:
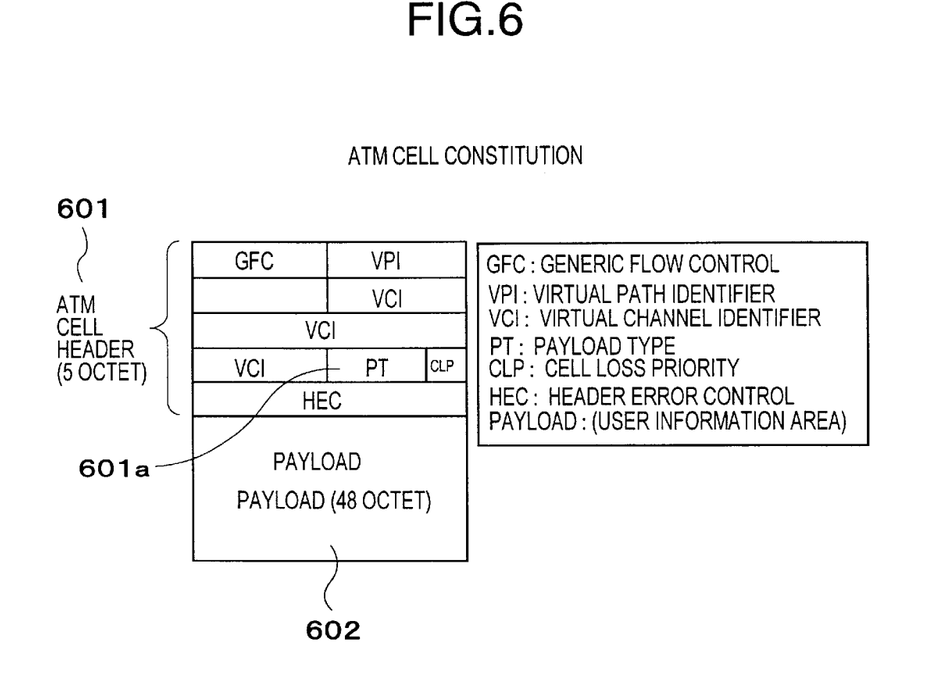
FIG. 6 is a view illustrating a format of an ATM cell.

As shown in FIG. 6, an ATM cell includes an ATM cell header 601 of 5 octets, and a payload 602 of 48 octets. In the embodiment, by setting the payload type (PT) 601a of the ATM cell header as a specific value, a connection control ATM cell used for the transmission of the backup connection information and a connection control ATM cell used for the transmission of the backup connection response information can be identified. In the payload 602 of the connection control ATM cell, either the backup connection information or the backup connection response information defined by the specific value stored in the PT 601a is stored.

Figure 7:
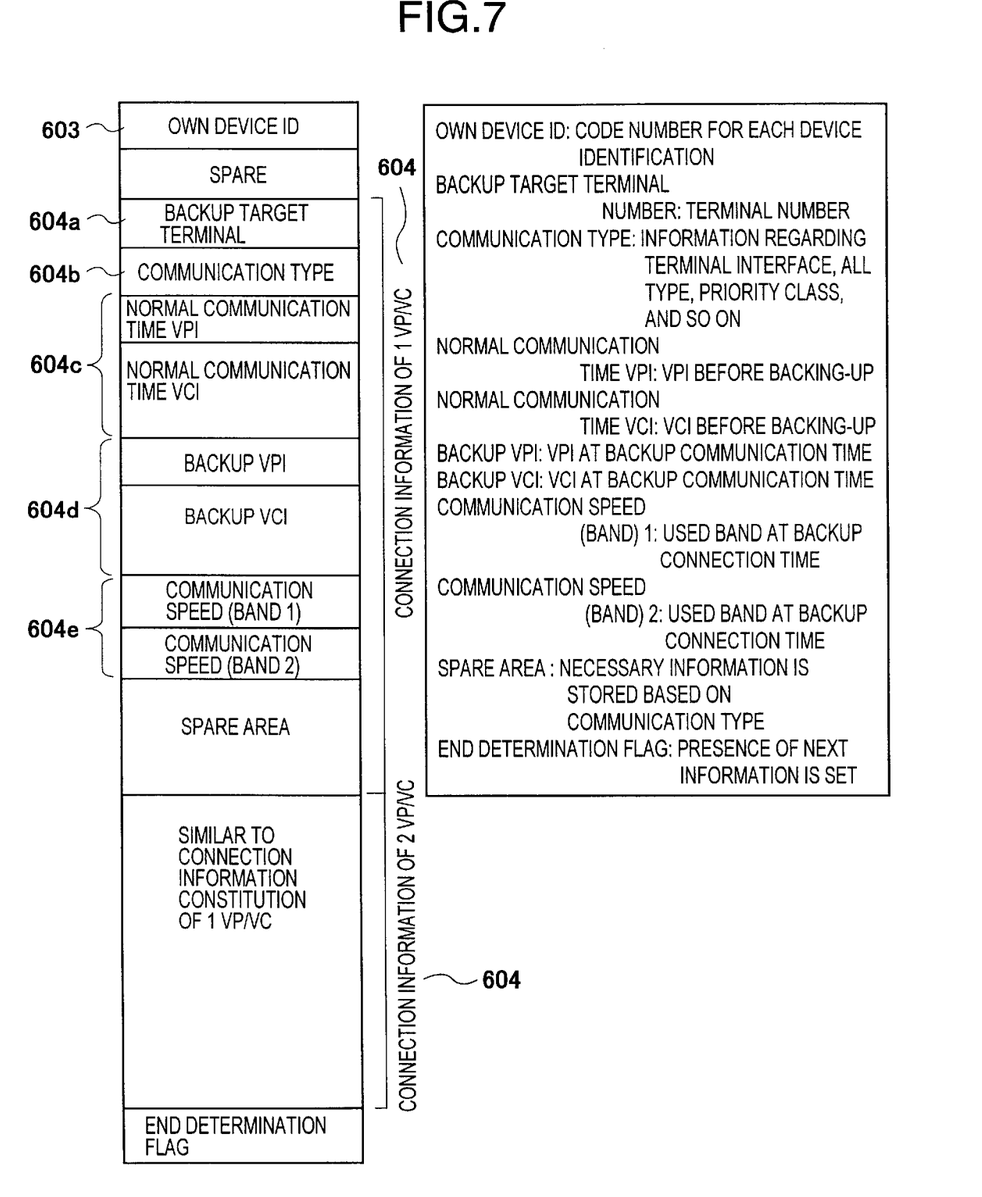
FIG. 7 is a view illustrating a format of backup connection information used in the embodiment of the present invention.

FIG. 7 shows such backup connection information to be stored in the payload.

As shown in FIG. 7, the backup connection information contains an own device ID 603 indicating the device of a transmission origin, and connection information 604 provided for each VP/VC, which is to be backed up. In addition, each connection information 604 includes a backup target terminal number 604a, a communication type 604b, a VPI/VCI 604c for normal communication, a backup VPI/VCI 604d, and a communication speed 604e.

The backup target terminal number 604a is set when the ATM multiplexer 20 is a transmission origin, and represents the identification information of a terminal connected to the own device, which carries out communications by using a VP/VC, which are to be backed up.

The communication type 604b is set irrespective of the type of a transmission origin, and represents the service class of a backup VP/VC.

The VPI/VCI 604c for normal communication is set when the ATM switch 30 is a transmission origin, and represents the VPI/VCI of a VP/VC, which is to be backed up.

The backup VPI/VCI 604d is set irrespective of the type of a transmission origin, and represents the VPI/VCI of a backup VP/VC.

The communication speed 604e is set irrespective of the type of a transmission origin, and represents the band of a backup VP/VC.

Figure 8:
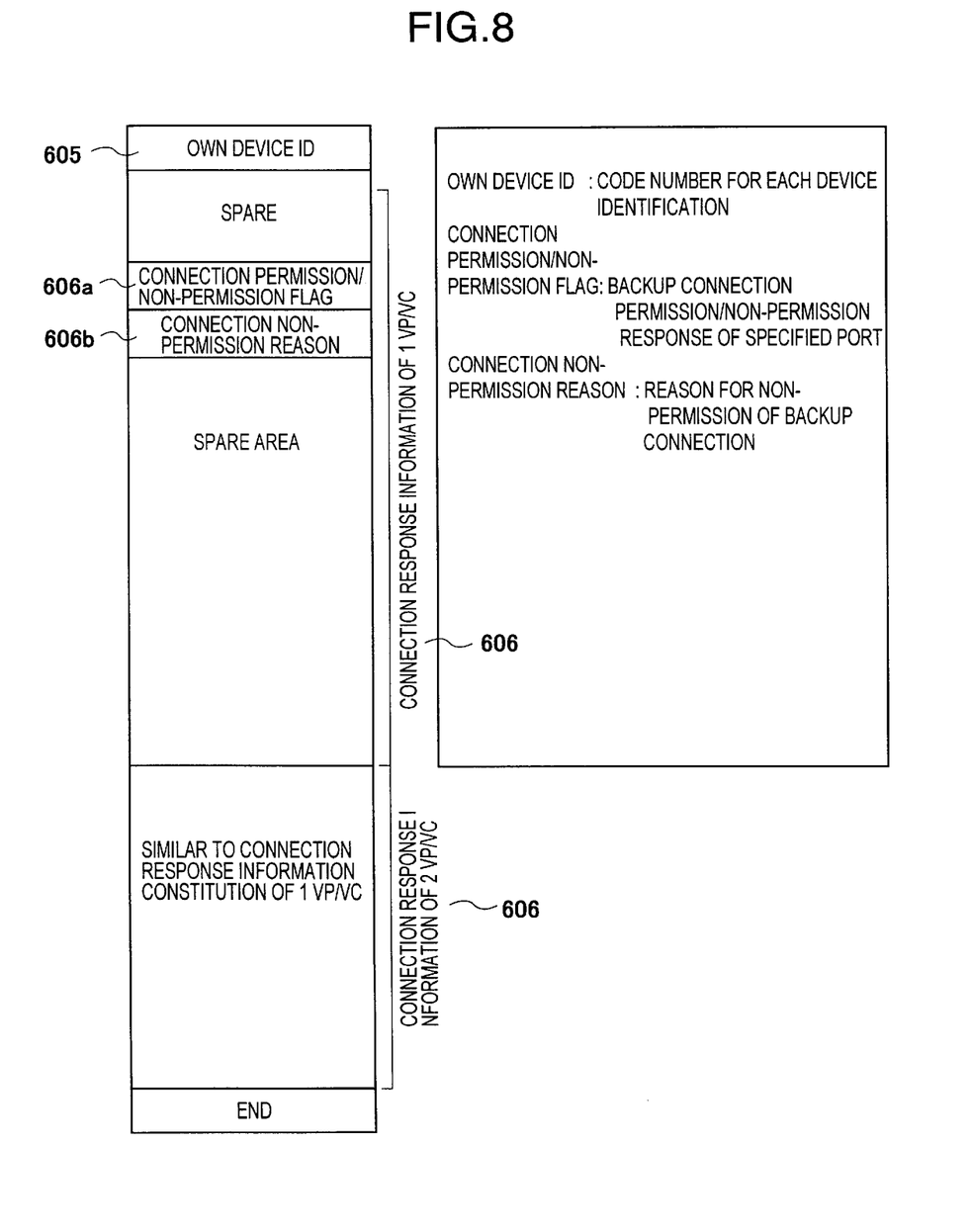
FIG. 8 is a view illustrating a format of backup connection response information used in one embodiment of the present invention.

Next, FIG. 8 shows backup connection response information to be stored in the payload.

As shown in FIG. 8, the backup connection response information contains an own device ID 605 indicating the device of a transmission origin, and connection response information 606 set for each VP/VC, which is to be backed up. In addition, each connection response information 606 includes a connection permission/non-permission flag 606a indicating the permission/non-permission of connection, and a connection non-permission reason 606b indicating a reason for the non-permission of connection. Here, in the connection non-permission reason 606b, information regarding the VPI/VCI of a VP/VC permitted to be connected, a band, a service class, or the like may be included. The ATM multiplexer 20 that has received the backup connection response information, in which the connection non-permission thereof is indicated by the connection permission/non-permission flag 606a, may create an alternative of backup VP/VC based on the above-described information included in the connection non-permission reason 606b.

The embodiment of the present invention has been described.

As described above, according to the embodiment, a VPI/VCI for identifying a backup VP/VC, a band, a service class, and so on, are decided by negotiation carried out between the devices engaged in communications, which are to be backed up during the execution of the backup. Accordingly, it is not necessary to preset a VPI/VCI for identifying the backup VP/VC, a band, a service class or the like as backup constitution information in each device so as to match between the devices for carrying out communications using the ATM.

To be concrete, in the ATM multiplexer of the present embodiment, it is only necessary to have information regarding the terminal of a communication partner, with which each terminal connected to the own device communicates, information regarding the ATM multiplexer connecting the terminal of the communication partner, and a policy that decides how to set the way or the priority of the VPI/VCI of a backup VP/VC, a band, a service class, and so on.

Note that the invention is not limited to the embodiment, and various changes and modifications can be made within the teaching of the invention.

For example, the ISDN line used for the backup needs not be established by call control during the backup. That is, the ISDN line may always be established. Alternatively, the ISDN line may be set as a dedicated line. Otherwise, as a communication channel used for backing-up, a communication network or a communication channel other than the ISDN line may be used.

As apparent from the foregoing, the present invention is advantageous in that even without presetting any detailed information regarding a virtual communication channel set on a non-ATM line, the backup using the non-ATM line can be carried out for the virtual communication channel on the ATM network.

What is claimed is:

1. An asynchronous transfer mode (ATM) device for carrying out communications with an opposite device by using a virtual communication channel on an ATM network provided by a virtual path/virtual channel (VP/VC) fixedly set based on a permanent virtual channel (PVC), comprising:

setting means for setting a communication path on a non-ATM network so as to connect with said opposite device, the communication path being used for backing up said virtual communication channel;

deciding means for considering said communication path as a transmission path for an ATM cell when failure occurs in said virtual communication channel, and then deciding a channel characteristic of a backup virtual communication channel set on said communication path by negotiating with said opposite device through said communication path; and switching means for switching a communication channel to be used for communications with said opposite device from said failed virtual communication channel to the backup virtual communication channel on said communication path having the channel characteristic decided by said deciding means when the failure occurs in said virtual communication channel.

2. The ATM device according to claim 1, wherein said channel characteristic includes at least one selected from a virtual path identifier/virtual channel identifier (VPI/VCI) of said backup virtual communication channel, a band of said backup virtual communication channel, and a service class of said virtual communication channel.

3. The ATM device according to claim 1, wherein said deciding means negotiates with said opposite device so as to make a channel characteristic of said backup virtual communication channel acceptable to said ATM device when the channel characteristic of said backup virtual communication channel requested by said opposite device is unacceptable in said negotiation.

4. The ATM device according to claim 1, wherein said ATM device is an ATM multiplexer for relaying data received from a terminal housed therein to said ATM network.

5. The ATM device as an ATM multiplexer according to claim 4, wherein for each connected terminal, said deciding means negotiates with said opposite device with which communications are carried out by using said virtual communication channel, the failure having occurred therein, when the failure occurs in the virtual communication channel used for communications by said terminal to decide a channel characteristic of the backup virtual communication channel, and for each connected terminal, said switching means switches a communication channel connecting with said opposite device with which communications are carried out by using said virtual communication channel, the failure having occurred therein, from said failed virtual communication channel to the backup virtual communication channel on said communication path, the backup virtual communication channel having the channel characteristic decided by said deciding means through negotiation with said opposite device when failure occurs in said virtual communication channel used for communications by said terminal.

6. The ATM device according to claim 1, wherein said ATM device is an ATM switch.

7. The ATM device according to claim 1, wherein said non-ATM network is an integrated service digital network (ISDN).

8. A subscriber system of an asynchronous transfer mode (ATM) network, comprising:

an ATM device according to claim 4; and at least one terminal housed in said ATM device.

9. A communication system comprising:

at least one subscriber system according to claim 8;

an ATM network; and a non-ATM network.

10. A backup method for backing up a virtual communication channel on an asynchronous transfer mode (ATM) network provided by a virtual path/virtual channel (VP/VC) fixedly set based on a permanent virtual channel (PVC) by using a communication path on a non-ATM network, comprising the steps of:

setting the communication path on said non-ATM network used for backing up said virtual communication channel so as to be connect with an opposite device, with which communications are carried out by using said virtual communication channel;

considering said communication path as a transmission path for an ATM cell when failure occurs in said virtual communication channel, and then deciding a channel characteristic of the backup virtual communication channel by negotiating with said opposite device through said communication path, the backup virtual communication channel being set on said communication path; and switching a communication channel connecting with said opposite device from said failed virtual communication channel to the backup virtual communication channel on said communication path, the backup virtual communication channel having the channel characteristic decided through the negotiation with said opposite device when failure occurs in said virtual communication channel.

* * * * *